(12) United States Patent
Kürten et al.

(10) Patent No.: US 12,323,082 B2
(45) Date of Patent: Jun. 3, 2025

(54) POWER CONVERTER ARRANGEMENT

(71) Applicant: Siemens Aktiengesellschaft, Munich (DE)

(72) Inventors: Bernd Kürten, Obermichelbach (DE); Lutz Namyslo, Hausen (DE); Benno Weis, Hemhofen (DE)

(73) Assignee: Siemens Aktiengesellschaft, Munich (DE)

(*) Notice: Subject to any disclaimer, the term of this patent is extended or adjusted under 35 U.S.C. 154(b) by 118 days.

(21) Appl. No.: 18/276,894

(22) PCT Filed: Dec. 10, 2021

(86) PCT No.: PCT/EP2021/085196
§ 371 (c)(1),
(2) Date: Aug. 11, 2023

(87) PCT Pub. No.: WO2022/171332
PCT Pub. Date: Aug. 18, 2022

(65) Prior Publication Data
US 2024/0128898 A1 Apr. 18, 2024

(30) Foreign Application Priority Data
Feb. 15, 2021 (EP) .................... 21157020

(51) Int. Cl.
*H02P 29/68* (2016.01)
*H02P 5/50* (2016.01)
*H02P 27/06* (2006.01)

(52) U.S. Cl.
CPC ............... *H02P 5/50* (2013.01); *H02P 27/06* (2013.01)

(58) Field of Classification Search
CPC .......... H02P 5/50; H02P 27/06; H02P 27/085; H02P 29/60; H02P 29/68; H02P 5/00
See application file for complete search history.

(56) References Cited

U.S. PATENT DOCUMENTS

| 2008/0150455 A1 | 6/2008 | Shinmura et al. |
| 2014/0361721 A1 | 12/2014 | Yamaguchi |
| 2015/0295532 A1 | 10/2015 | Sakai |

(Continued)

FOREIGN PATENT DOCUMENTS

| DE | 102014008642 | 1/2015 |
| DE | 102016010409 B4 | 3/2020 |
| EP | 0340520 B1 | 12/1992 |

OTHER PUBLICATIONS

PCT International Search Report dated Jul. 4, 2022 based on PCT/EP2021/085196 filed Dec. 10, 2021.

*Primary Examiner* — Muhammad S Islam
(74) *Attorney, Agent, or Firm* — Cozen O'Connor

(57) ABSTRACT

A power converter arrangement includes semiconductor arrangements for two motors, wherein a control unit is used to continuously form a sum current composed of a first current and a second current and the sum current is compared with a predeterminable maximum value in order to protect the motors from being destroyed, where the control unit includes a device in which a priority grade is input by a user, where the priority grade describes the priority of one of the two machines, and where the control unit reduces the current of the respective machine that lacks priority according to the priority grade when the maximum value is exceeded.

7 Claims, 3 Drawing Sheets

(56) References Cited

U.S. PATENT DOCUMENTS

2017/0063285 A1    3/2017  Yamaguchi et al.
2017/0170097 A1    6/2017  Makino et al.
2021/0036652 A1*   2/2021  Gemassmer ............ H02P 29/68

* cited by examiner

POWER CONVERTER ARRANGEMENT

CROSS-REFERENCE TO RELATED APPLICATIONS

This is a U.S. national stage of application No. PCT/EP2021/085196 filed 10 Dec. 2021. Priority is claimed on European Application No. 21157020.5 filed 15 Feb. 2021, the content of which is incorporated herein by reference in its entirety.

BACKGROUND OF THE INVENTION

1. Field of the Invention

The invention relates to a power converter arrangement comprising a first semiconductor arrangement configured to supply a first electric machine with a first current, a second semiconductor arrangement that is configured to supply a second electric machine with a second current, a first current measurer that is configured to determine the first current that is supplied to the first electric machine, a second current measurer that is configured to determine the second current that is supplied to the second machine, a control unit that is provided with a first output for outputting a first control variable for the first semiconductor arrangement and a second output for outputting a second control variable for the second semiconductor arrangement, where the control unit is configured to provide the control variables, and furthermore includes a first input that is connected to the first current measurer and a second input that is connected to the second current measurer.

2. Detailed Description of the Related Art

If a power converter arrangement, such as a frequency inverter, is realized so as to control two motors or axles simultaneously, in general loss-generating power modules, in particular semiconductor arrangements, are in many cases thermally connected in series. For an economical realization, in particular for warehousing, the semiconductor modules for the first motors that are to be driven and for the second motors that are to be driven are frequently realized as identical whereby a high degree of similarity is achieved in the device in relation to an optimized production.

However, if the two motors are later operated in a real operation with their rated current, then there is thus the risk that the semiconductor arrangement, for example, for the second motor to be overheated, because a heat sink under the two semiconductor arrangements is already preheated by the first semiconductor arrangement for the first electric machine on account of the semiconductor modules being arranged one behind the other, in this case thermally connected in series.

It is known from practice and possible to use heat sinks to cool semiconductor components.

EP 0 340 520 B1 discloses an arrangement for convective cooling of components, which has a heat sink that is assembled from two parts that are arranged one above the other.

U.S. Pub. No. 2008/150455 A1 discloses a control unit for two electric motors, which is designed so as to coordinate the energizing of the coils so that a current component does not flow through the wrong coil.

U.S. Pub. No. 2015/295532 A1 discloses a controller for an electric compressor, where the rotational speed of a motor is controlled by the compression mechanism.

U.S. Pub. No. 2017/170097 A1 discloses a heat sink of a power unit on which a first and a second power semiconductor part is mounted.

For production-technical reasons and owing to a simpler constructive design and/or a space-saving arrangement, for example, in power converter arrangements, particularly in the case of frequency inverters, the semiconductor arrangements that are required for the control of a motor are often arranged on a common heat sink so as to dissipate heat. These semiconductor arrangements are placed one after the other in relation to a direction of a cooling medium flow whereby a thermal series circuit is provided. This thermal series circuit leads to a decreasing cooling effect the further the respective semiconductor component, which is to be cooled, lies from an inlet of the cooling medium.

SUMMARY OF THE INVENTION

It is an object of the present invention to provide a power converter arrangement in which the operation of a second semiconductor arrangement does not lead to destruction on account of reaching a limit temperature.

This and other objects and advantages are achieved in accordance with the invention by a power converter having a control unit that is configured to continuously form a sum current from a first current and a second current and to compare the sum current with a maximum value, which can be predetermined, where the control unit has a storage device in which a priority rank can be input by a user, where the priority rank describes the priority of one of the two machines. Furthermore the control unit is additionally configured, in the event the maximum value is exceeded, to reduce the current of the respective machine that does not have (or lacks) priority in accordance with the priority rank.

Firstly, it is advantageous here that, for example, via a customer parameter, i.e., the priority rank, it is predetermined which of the two electric machines is to be prioritized in the event that, for example, a higher sum current should be required for one electric machine. It is then possible for another electric machine having a lower priority, perhaps if it also does not even need to be operated at the moment, to be shut down or for its current to be reduced in favor of the other machine.

In this case, the control unit is configured to acquire a first or a second rotational speed and a first or a second torque respectively for the first machine and for the second machine, and the control unit is furthermore configured to determine, from the first rotational speed and the first torque a first active power or from the second rotational speed and the second torque, a second active power and from the two active powers to determine a sum power, from the sum power in turn an intermediate circuit sum current is determined, which is compared with the maximum value.

With regard to installation in an industrial system, the power converter arrangement is particularly advantageously formed as a plug-in module having a perpendicular installation position, where the first semiconductor arrangement and the second semiconductor arrangement are arranged one behind the other together on a heat sink, and where a longitudinal axis of the heat sink is arranged vertically and thus a flow direction for a cooling medium is formed by the plug-in module parallel to the longitudinal axis and an inlet for the cooling medium is arranged on the bottom and an outlet for the cooling medium is arranged on top.

In a further embodiment, the maximum value is advantageously selected such that it is smaller than a sum of a first rated current of the first machine and a second rated current of the second machine. In accordance with the disclosed embodiments of the invention, a simultaneous operation of the two machines using their rated current in the event that the power converter arrangement or its heat sink reaches a limit temperature at which an operation of the second semiconductor arrangement is no longer permissible or would lead to destruction should be prevented.

In other words, the sum current of the two electric machines is limited to a value that is smaller than the sum of the specified nominal currents for the machines. In this regard, the sum current of the two electric machines is acquired or calculated by the control unit and is limited to a maximum value that is smaller than the sum of the two rated currents of the two electric drives. For example, if the rated current of the two electric machines is 18 amperes each, then the sum current could thus also be limited to a value of for example 30 amperes.

In a further embodiment, the control unit is advantageously configured, in the event the maximum value is exceeded, to reduce a switching frequency of the respective semiconductor arrangements that does not have priority in accordance with the priority rank.

In this embodiment, in addition to the current limitation, the switching frequency of one of the two semiconductor arrangements can be reduced. This corresponds to a smaller active power and accordingly to a smaller power loss, which is converted into heat.

A current that is relevant for the supply at the intermediate circuit results from the individual loads of the connected electric machines. For each electric machine, it is possible to determine from their rotational speed and their torque curve the required active power as a function of the time. The active power results from P=M·ω+P-losses. The sum of the active powers of all the electric machines results in the power curve that actually prevails in the intermediate circuit.

Furthermore, it is advantageous if the control unit is formed as a superordinate controller.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The drawings illustrate an exemplary embodiment of the invention, in which.

DETAILED DESCRIPTION OF THE EXEMPLARY EMBODIMENTS

Figure 1:
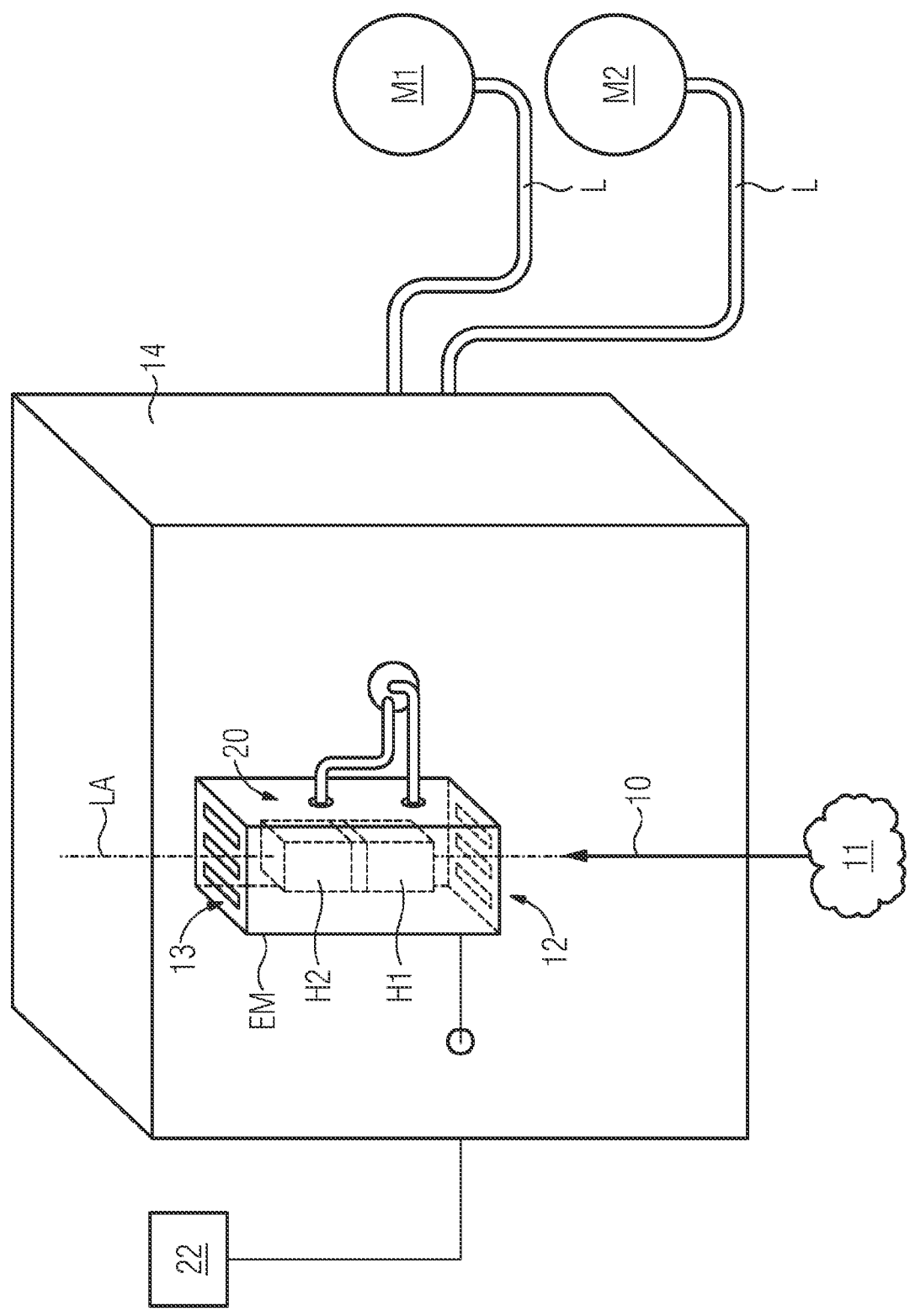
FIG. 1 shows a power converter arrangement in a switch cabinet in accordance with the prior art.

With reference to FIG. 1, a switch cabinet 14 is illustrated in which a power converter arrangement 20 is plugged in as a plug-in module EM. The power converter arrangement 20 is controlled by a superordinate controller 22. A first machine M1 and a second machine M2 is connected to the power converter arrangement 20. The power converter arrangement 20 supplies the first machine M1 with a first current $I1_{actual}$ and the second machine M2 with a second current $I2_{actual}$.

In order to cool a first semiconductor arrangement H1 and a second semiconductor arrangement H2 within the electric module EM or the power converter arrangement 20, the electric module EM has an inlet 12. Owing to convection, a cooling medium 11 can flow into the inlet 12 in the flow direction 10 and can cool the first semiconductor arrangement H1 and the second semiconductor arrangement H2 and can escape again from an outlet 13. The first semiconductor arrangement H1 and the second semiconductor arrangement H2 are connected one behind the other. As a result, the second semiconductor arrangement H2 cannot be cooled to the same extent as the first semiconductor arrangement H1, because the cooling medium 11 has already been heated. Furthermore, the first semiconductor arrangement H1 and the second semiconductor arrangement H1 in general sit on a common heat sink KK.

Figure 2:
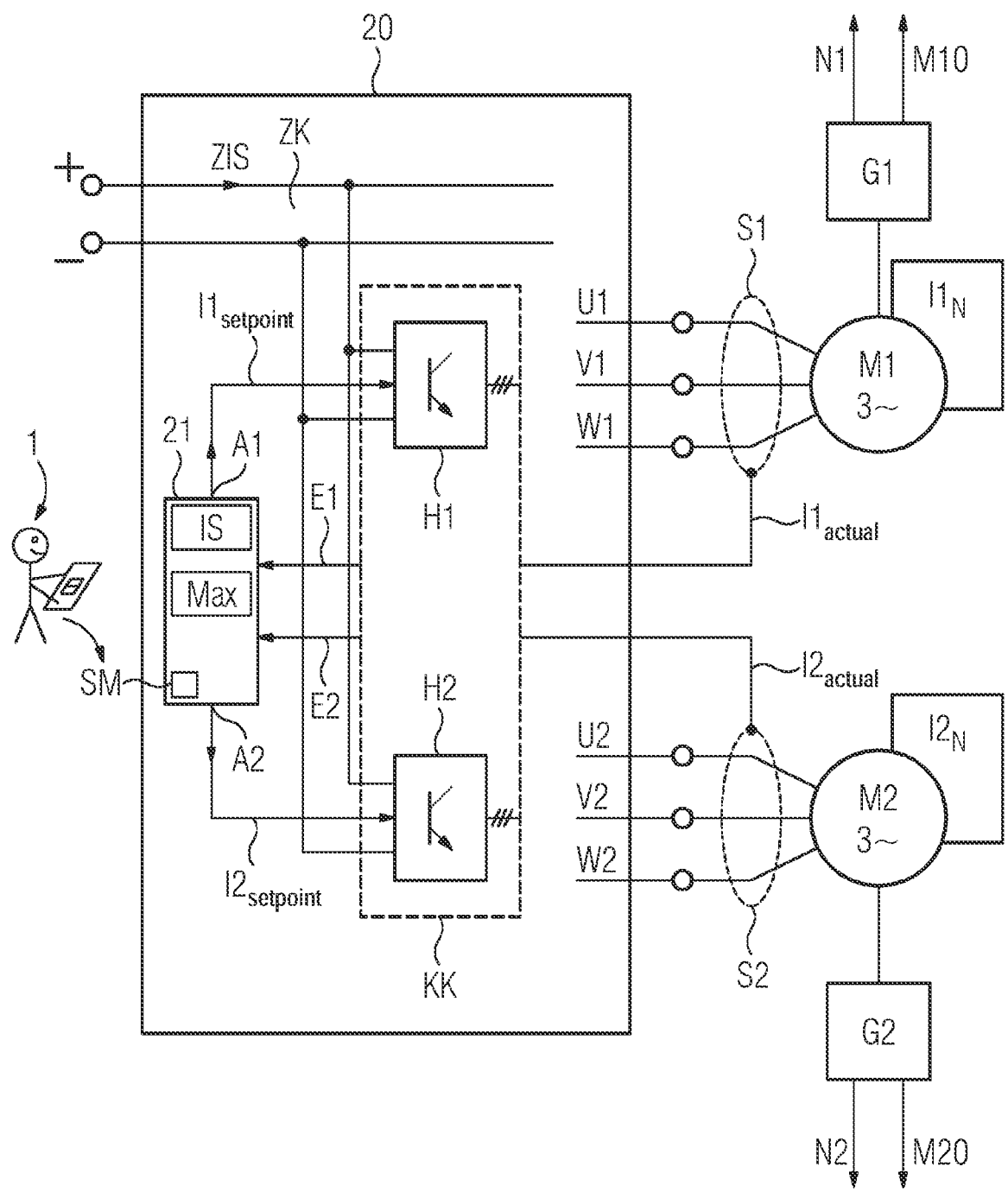
FIG. 2 shows the schematic construction of a power converter arrangement having a control unit in accordance with the invention.

In order to now avoid the situation in which, for example, the second semiconductor arrangement H2 can no longer be operated or is even destroyed on account of a thermal overload, in accordance with FIG. 2 the power converter arrangement 20 is further described as having a control unit 21.

FIG. 2 illustrates the power converter arrangement 20, thus comprising the first semiconductor arrangement H1, which is configured to supply the first electric machine M1 with the first current $I1_{actual}$ and the second semiconductor arrangement H2, which is configured to supply the second electric machine M2 with the second current $I2_{actual}$. The power converter arrangement 20 furthermore comprises a first current measurer S1 that is configured to determine the first current $I1_{actual}$ that is supplied to the first electric machine M1, and a second current measurer S2 that is configured to determine the second current $I2_{actual}$ that is supplied to the second electric machine M2. The control unit 21 in this case is formed with a first output A1 so as to output the corresponding control variables for the control of the current for the first electric machine M1 for the output of a first control variable $I1_{setpoint}$ for the first semiconductor arrangement H1. Furthermore, the control unit is formed with a second output A2 for the output of a second control variable $I2_{setpoint}$ for the second semiconductor arrangement H2. The control unit 21 has a first input E1 that is connected to the first current measurer S1. A second input E2 of the control unit 21 is connected to the second current measurer S2.

The control unit 21 is configured to continuously form a sum current IS from the first current $I1_{actual}$ and the second current $I2_{actual}$ and configured to compare the sum current IS with a maximum value Max, which can be predetermined. The control unit 21 has a storage device SM and this storage device SM can be parameterized by a user 1 using a priority rank PR via a control device. The priority rank PR describes the priority of one of the two machines M1, M2 which, in the event of an overload, is still to be supplied in any event with its current. For this purpose, the control unit 21 is configured to reduce the current $I1_{actual}$, $I2_{actual}$ of the respective machine M1, M2, which does not have (or lacks) priority in accordance with the priority rank PR, in the event of exceeding the maximum value Max, in other words the sum current IS is greater than the maximum value Max.

The first electric machine M1 as a three-phase machine having connectors U1, V1, W1 is schematically connected to the first semiconductor arrangement H1. The second electric machine M2 as a three-phase machine having connectors U2, V2, W2 is connected to the second semiconductor arrangement H2.

The first semiconductor arrangement H1 and the second semiconductor arrangement H2 are arranged on a common heat sink KK. In order for the one semiconductor arrangement H1, H2 or the other semiconductor arrangement H1, H2 to not overheat on account of the installation position, the power converter arrangement 20 is provided with the control unit 21 for disconnecting the current that is in each case not prioritized.

For a further improved determination of a sum current IS or of an intermediate circuit sum current ZIS, a first encoder G1 is connected to the first electric machine M1 and a second encoder G2 is connected to the second electric machine M2. It is possible via the two encoders G1 and G2 for the first electric machine M1 to transmit a first rotational speed N1 and a first torque M10 or the second electric machine M2 to transmit a second rotational speed N2 and a second torque M20 to the control unit 21.

The first electric machine M1 and the second electric machine M2 are in general to be operated using their respective nominal currents $I1_N$ or $I2_N$ and their nominal powers $P1_N$ and $P2_N$.

Figure 3:
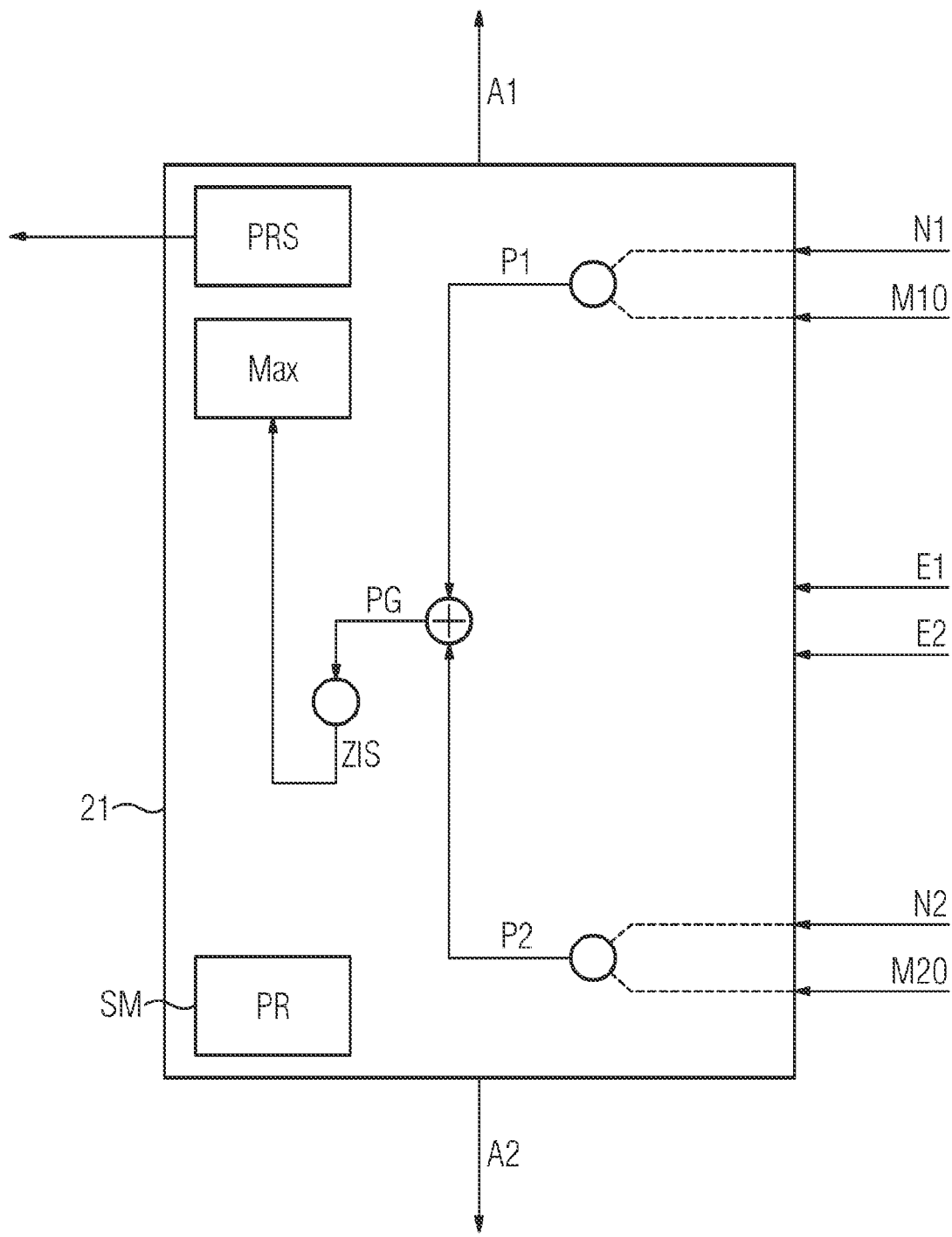
FIG. 3 shows the control unit having additional input variables in accordance with the invention.

FIG. 3 describes the above-described broadened behavior of the control unit 21 with respect to the acquisition of the rotational speed and the acquisition of the torque. In order to determine an intermediate circuit sum current ZIS, the control unit 21 is furthermore configured to acquire a first or a second rotational speed N1, N2 and a first or a second torque M10, M20 respectively for the first electric machine M1 and the second electric machine M2, furthermore the control unit is configured to calculate, from the first rotational speed N1 and the first torque M1, a first active power P1. A second active power P2 is calculated from the second rotational speed N2 and the second torque M20. A sum power PG is determined from the two active powers P1, P2.

This sum power PG in turn allows conclusions regarding an intermediate circuit sum current ZIS and this intermediate circuit sum current ZIS cannot exceed a maximum value Max. For this purpose, the intermediate circuit sum current ZIS is compared with the maximum value Max. In the event of exceeding the maximum value, the current for the machine M1, M2, which does not have (or lacks) priority in accordance with the priority rank PR, is reduced via a priority switch PRS.

It is regarded as a particular advantage that the priority rank PR can be predetermined as a customer parameter according to which a customer or a user 1 can parameterize their priority rank PR according to application. This parameter can even be changed during operation of the power converter arrangement 20 and thus renders possible an adaptation of the respective system to changes of an application.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A power converter arrangement formed as a plug-in module having a perpendicular installation position, comprising:
    a first semiconductor arrangement configured to supply a first electric machine with a first current;
    a second semiconductor arrangement configured to supply a second electric machine with a second current, the first and second semiconductor arrangements being arranged behind one another together on a heat sink, and a longitudinal axis of the heat sink being arranged vertically such that a flow direction for a cooling medium is formed by the plug-in module parallel to the longitudinal axis and an inlet for the cooling medium is arranged on a bottom and an outlet for the cooling medium is arranged on top;
    a first current measurer configured to determine the first current which is supplied to the first electric machine;
    a second current measurer configured to determine the second current which is supplied to the second electric machine; and
    a control unit having a first output for outputting a first control variable for the first semiconductor arrangement, a second output for outputting a second control variable for the second semiconductor arrangement, a first input which is connected to the first current measurer and a second input which is connected to the second current measurer, the control unit being configured to provide the control variables;
    wherein the control unit includes a storage device in which a priority rank is input by a user, the priority rank describing a priority of one machine of the first and second electric machines;
    wherein the control unit is further configured to:
        continuously form a sum current from the first current and the second current and configured to compare the sum current with a predeterminable maximum value;
        reduce the current of a respective machine of the first and second electric machines which lacks priority in accordance with the priority rank in an event the maximum value is exceeded;
        acquire a first or a second rotational speed and a first or a second torque respectively for the first electric machine and for the second electric machine; and
        calculate from the first rotational speed and the first torque a first active power or from the second rotational speed and the second torque a second active power and from the first and second active powers to determine a sum power, from the sum power in turn an intermediate circuit sum current is determined, which is compared with the maximum value;
    wherein the current for the machine, which lacks priority in accordance with the priority rank, is reduced via a priority switch such that the operation of the second semiconductor arrangement does not lead to destruction on account of reaching a limit temperature in the event the maximum value is exceeded.

2. The power converter arrangement as claimed in claim 1, wherein the maximum value is selected such that said maximum value is smaller than a sum of a first rated current of the first machine and a second rated current of the second machine.

3. The power converter arrangement as claimed in claim 1, wherein the control unit is further configured to reduce a switching frequency of the respective semiconductor arrangement which lacks priority in accordance with the priority rank more designed in the event the maximum value is exceeded.

4. The power converter arrangement as claimed in claim 1, wherein the control unit comprises a superordinate controller.

5. The power converter arrangement as claimed in claim 2, wherein the control unit is further configured to reduce a switching frequency of the respective semiconductor arrangement which lacks priority in accordance with the priority rank more designed in the event the maximum value is exceeded.

6. The power converter arrangement as claimed in claim 2, wherein the control unit comprises a superordinate controller.

7. The power converter arrangement as claimed in claim 3, wherein the control unit comprises a superordinate controller.

* * * * *